(12) United States Patent
Shin

(10) Patent No.: US 6,995,813 B2
(45) Date of Patent: Feb. 7, 2006

(54) ROTATING AND REVERSING MECHANISM FOR LCD DISPLAY

(75) Inventor: Chen-Hwa Shin, No 5, Sec 5, Hsin-Yi Rd., Suite# 6A-13, Taipei (TW)

(73) Assignees: Transpacific System Co., Ltd., Taipei (TW); Chen-Hwa Shin, Taipei (TW)

(*) Notice: Subject to any disclaimer, the term of this patent is extended or adjusted under 35 U.S.C. 154(b) by 63 days.

(21) Appl. No.: 10/642,330

(22) Filed: Aug. 18, 2003

(65) Prior Publication Data

US 2005/0041171 A1    Feb. 24, 2005

(51) Int. Cl.
G02F 1/1333    (2006.01)
G06F 1/16    (2006.01)

(52) U.S. Cl. .......................................... 349/58; 361/681

(58) Field of Classification Search .................... 349/1, 349/58; 345/156, 905; 361/681; 386/124, 386/125, 126; 312/223.1
See application file for complete search history.

(56) References Cited

U.S. PATENT DOCUMENTS 6,850,407 B2 *   2/2005   Tanimoto et al. ........... 361/681
2001/0055071 A1 * 12/2001 Kawai et al. ........... 348/333.06
2004/0141284 A1 *  7/2004 Chen et al. ................. 361/681
2004/0160733 A1 *  8/2004 Hsu ........................... 361/681

FOREIGN PATENT DOCUMENTS

JP    10-126068    *  5/1998
JP    2000-011626  *  1/2000

* cited by examiner

Primary Examiner—Tarifur R. Chowdhury
Assistant Examiner—Tai Duong
(74) Attorney, Agent, or Firm—Bacon & Thomas, PLLC

(57) ABSTRACT

This invention relates to a rotating and reversing mechanism used on an LCD display. The existing combination of the LCD display and a CD player permits no rotating adjustment, not convenient for the audience to watch. This is an improvement of the combination of the LCD display and the CD player where a joint post is provided to join the CD player together, allowing the CD player to rotate at 180° and the LCD display to reverse at 360°. This mechanism permits an operator to turn the LCD display or the CD player at any angle for the best presentation, or turn both the LCD display and the CD player and reserve the LCD display at 180° to be hung on the wall as a screen for teaching, briefing, or movie playing.

3 Claims, 8 Drawing Sheets

US 6,995,813 B2

ROTATING AND REVERSING MECHANISM FOR LCD DISPLAY

FIELD OF THE INVENTION

This invention concerns a rotating and reversing mechanism of an LCD display in particular combining with the CD player, permitting the LCD display to stand upright and rotate at an adequate angle for the audience to watch or reverse the LCD display 180° overlapped on the back of the CD player to become one unit used at the status of hang.

BACKGROUND OF THE INVENTION

Up to now, most well-known CD players (for DVD and VCD) are provided, including palm and desk type, in which the CD player is outfitted with an LCD display which can be opened at 180°, but in most cases, it stands upright and the contents of the CD is displayed on the LCD display. The advantage is its compact design for easy to carry with. The desk-type CD player is linked to a TV set or a PC, and the CD is displayed on the TV set or the PC screen.

Neither of these CD players is convenient for the operator to rotate at any angle in the teaching and briefing where repeated rotation of the CD player or the LCD display is necessary. Even the palm type CD player, easy for the operator to rotate, but the teaching or briefing is frequently interrupted. Even though the external media such as TV sets, PC sets, they are bulky and heavy, not so easy to rotate in the teaching or briefing, and part of audience will lose the view of the CD contents.

In recent years, the RVs become popular. Some drivers fix the display of the CD player at a specific location, for his family to enjoy a static activity in the RV. This is not like the outdoor movie observation, because the LCD display and the CD player are fixed in a place and the LCD display is stationary with limited rotation, good for the front seat passengers to watch, but poor for the back seat passengers. There is room for improvement.

From the above statement, it is learned that the CD player is not a perfect design, requiring further improvement. The inventor has worked hard in the design of such associated products and been devoted with great effort to the improvement and finally come up with such rotating and reversing mechanism for the LCD display.

SUMMARY OF THE INVENTION

The major goal of the invention is to provide a rotating and reversing mechanism exclusively for the LCD display, which will combine with the CD player (for DVD and VCD). In application, they are placed on the table to turn up the LCD display displaying the contents of CD, at the case of necessary rotation of the LCD display convenient for the audience to watch, or to turn both the LCD display and the CD player to be hung on the wall for more great number of audience to watch.

To attain the above goal, this invention has designed a specific join post to link together the LCD display and the CD player. The LCD display contains the LCD display, the audio outlet, and the control buttons. The CD player comprises an upper casing and a lower casing, the CD reader, necessary circuits; the upper casing has a slot for inserting and retrieving the CD, a plurality of user-friendly control buttons. In particular, the lower end of the joint post is inserted into the joint hole on one side of the upper and lower casings and locked with the screw, permitting any rotation at a limited angle. The upper end of the joint post fits into a semi-circle concave notch on one side of the LCD display and locked in place with a pin, permitting a 360° rotation.

In a practical application, the CD player is placed on the table, the operator opens the LCD display from the CD player and rotates the LCD display to achieve a good presentation, or opens both the LCD display and the CD player, then turns the LCD display at 180° and overlaps to the back of the CD player which can be hung on the wall for teaching, briefing, and movie watching by a great number of audience.

The good features, goals, and characteristics of this invention are explained in great detail with the aid of embodiments as illustrated in the drawing.

DETAILED DESCRIPTION OF THE INVENTION

Figure 1:
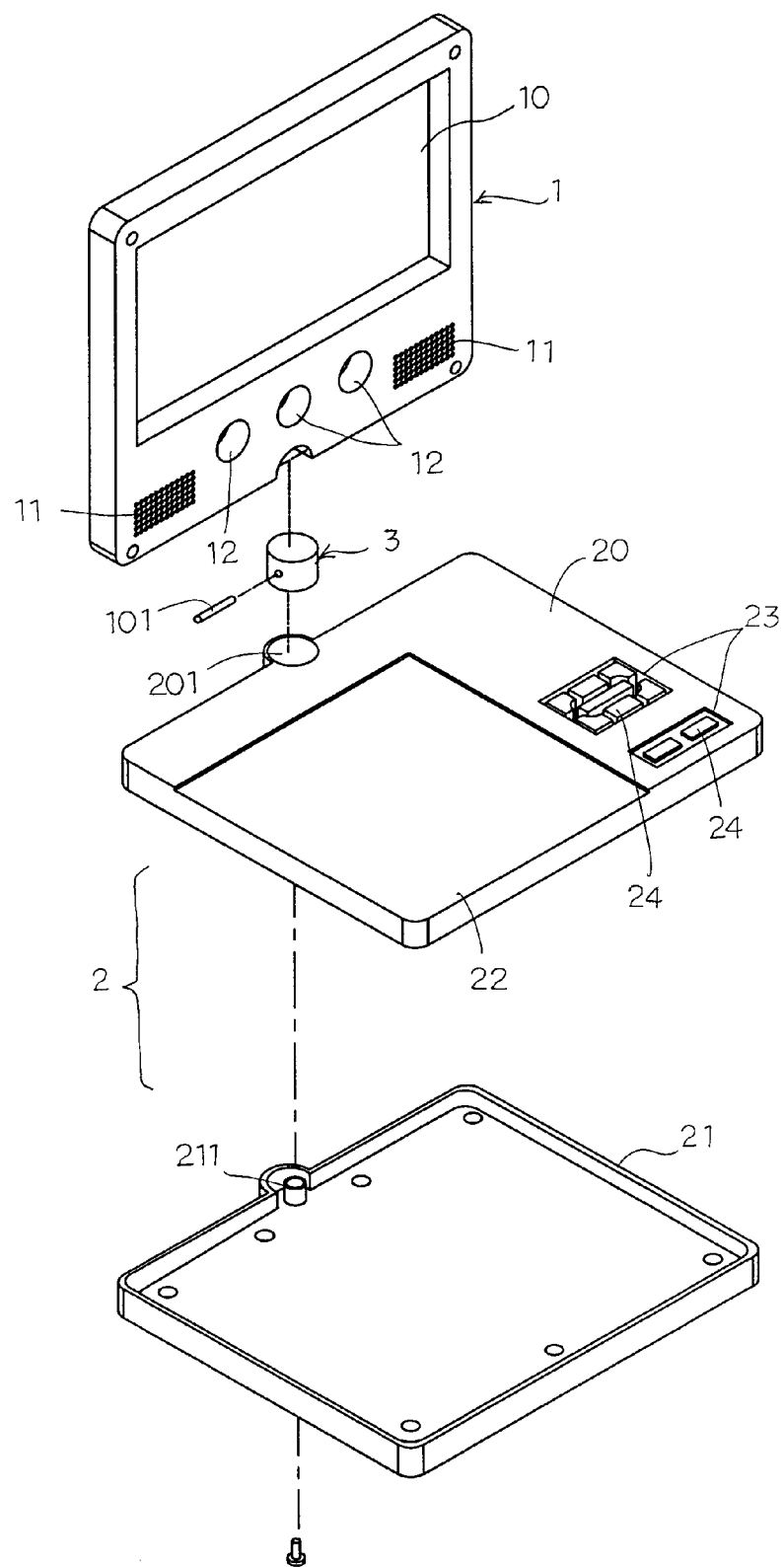
FIG. 1 shows a disassembly view of a preferred embodiment of this invention.
Figure 2:
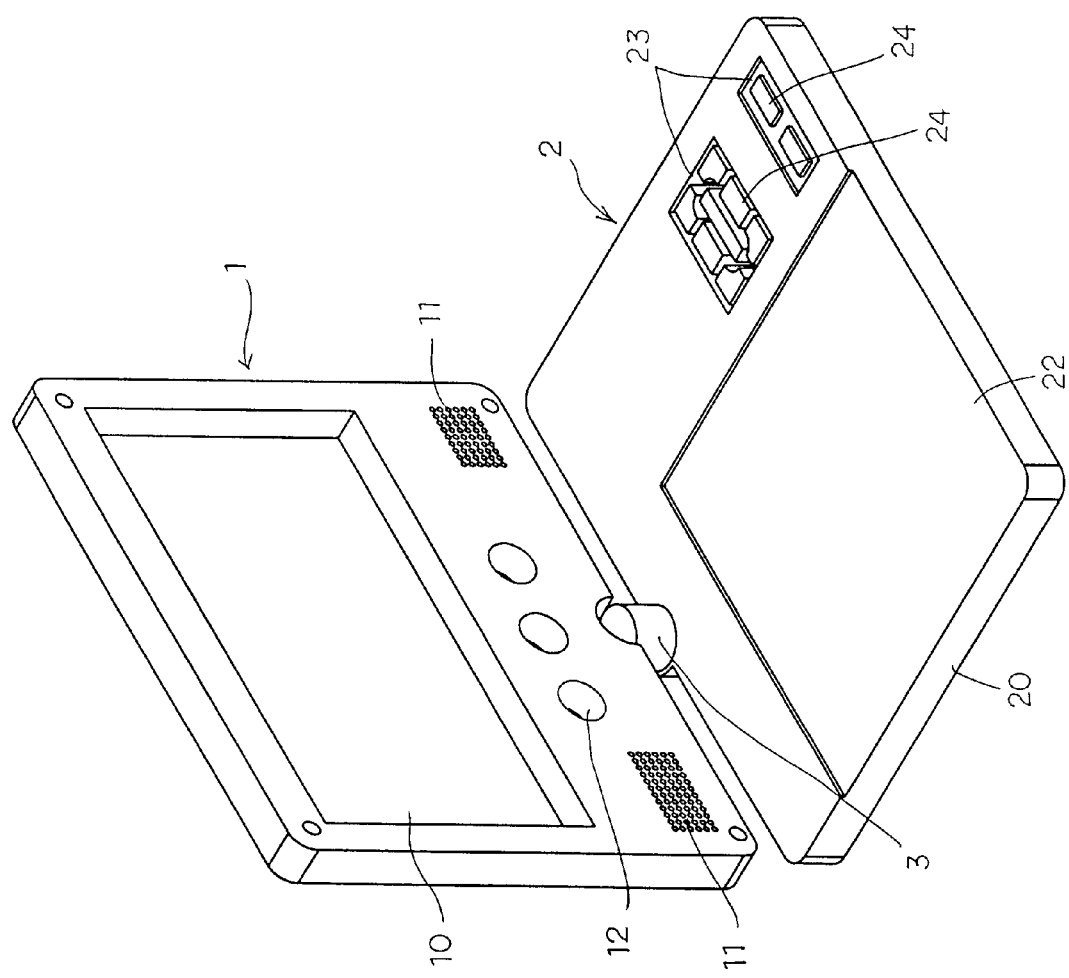
FIG. 2 shows an assembly view of a preferred embodiment of this invention.

FIGS. 1 and 2 show the rotating and reversing mechanism for the LCD display comprising at least an LCD display 1 and a CD player 2, in which The LCD display 1 contains an LCD display 10, an audio outlet 11, and control buttons 12. The display 10 displays the contents of the CD, the audio outlet 11 produces the audio effect, and the control buttons 12 control the brightness, color, and contrast of screen. The display can be reversed at 180°.

The CD player 2 contains the upper and lower casings 20, 21, including a CD reader and necessary circuits (not shown). The upper casing 20 provides a CD slot 22 which links to the CD reader and an operation area 23 with control buttons 24.

The main characteristics of this invention are the specially designed center hollow joint post 3 which links the LCD display 1 and the CD player 2. The hollow of the joint post 3 allows the passage of cable. The lower end of the joint post 3 will enter into the connecting holes 201 and 211 on the upper casing 20 and the lower casing 21 and lock therein, permitting a rotation of the CD player 2 at a limited angle. The upper end of the joint post 3 links with the LCD display and is locked with a pin 101, permitting a 360° reversal of the LCD display.

Figure 3:
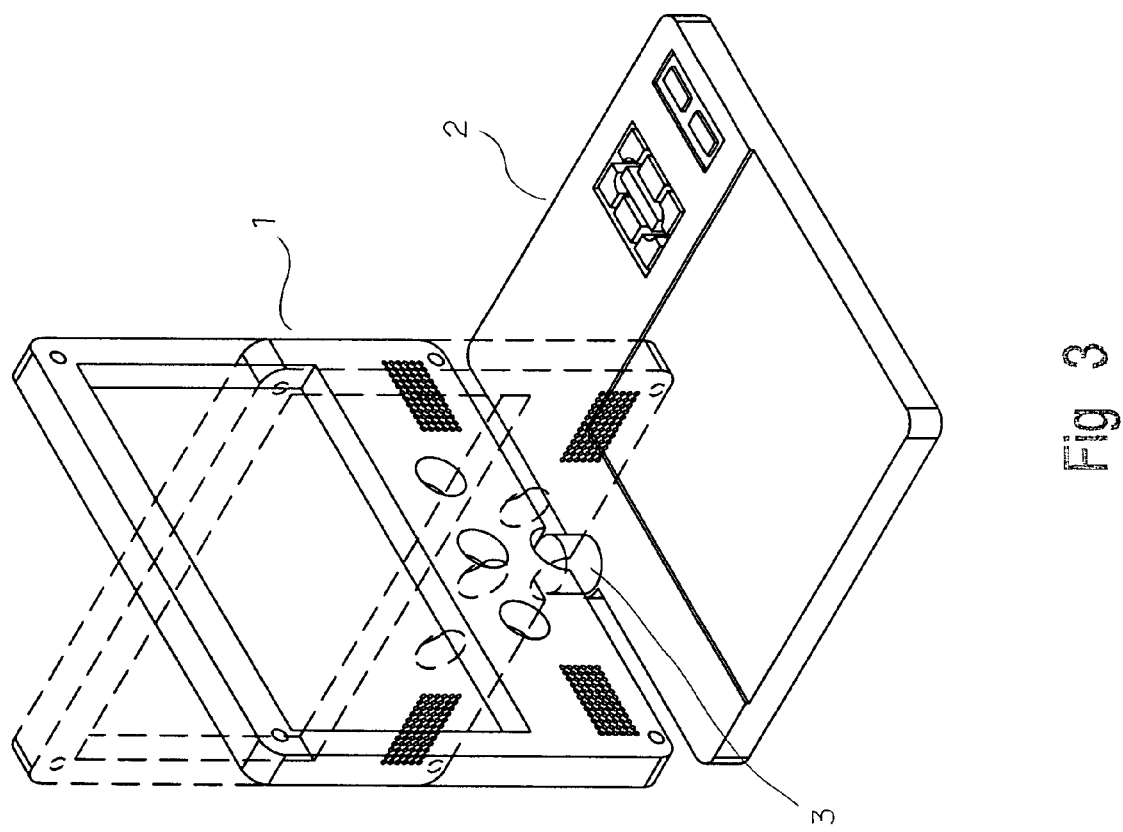
FIG. 3 shows a schematic diagram of an action the mechanism performs.

When the CD player 2 is placed on the flat table and the LCD display 1 stands up, the operator can turn the LCD display 1 to any angle as he/she desires as shown in FIG. 3 and processes his/her teaching, briefing, or movie play. In the RV, the CD player 2 can be fixed in one place, and the LCD display can be turned at a direction as convenient and comfortable for back seat passengers to watch.

Figure 4:
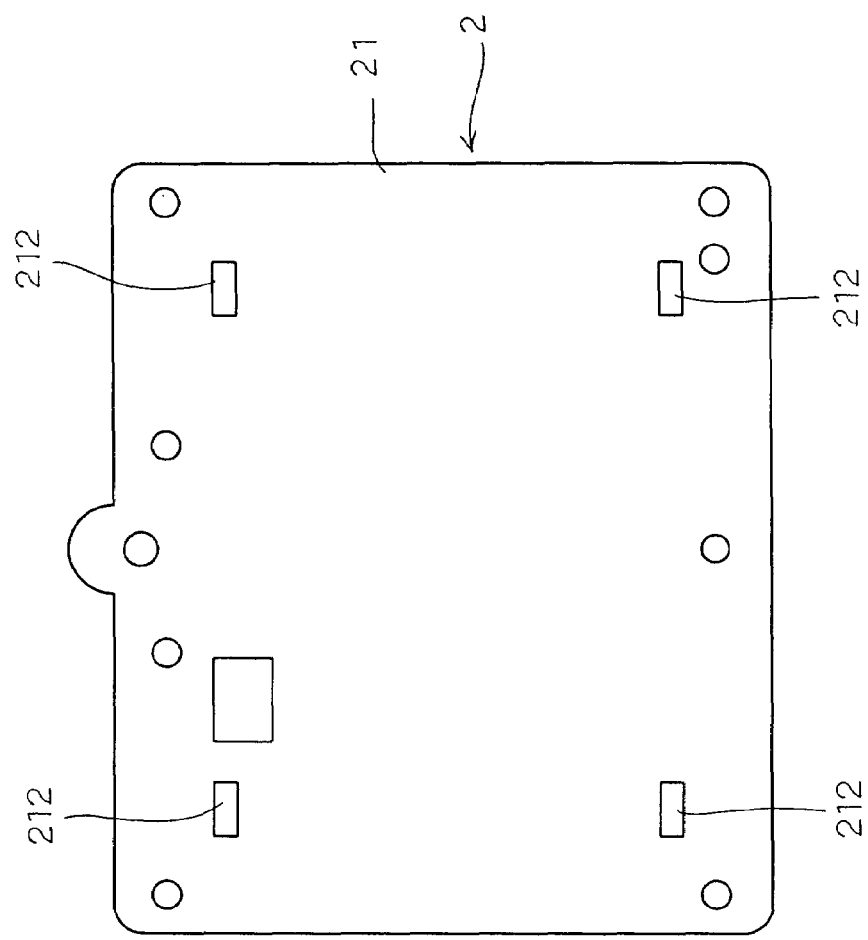
FIG. 4 is a bottom view of a preferred embodiment of this invention
Figure 5:
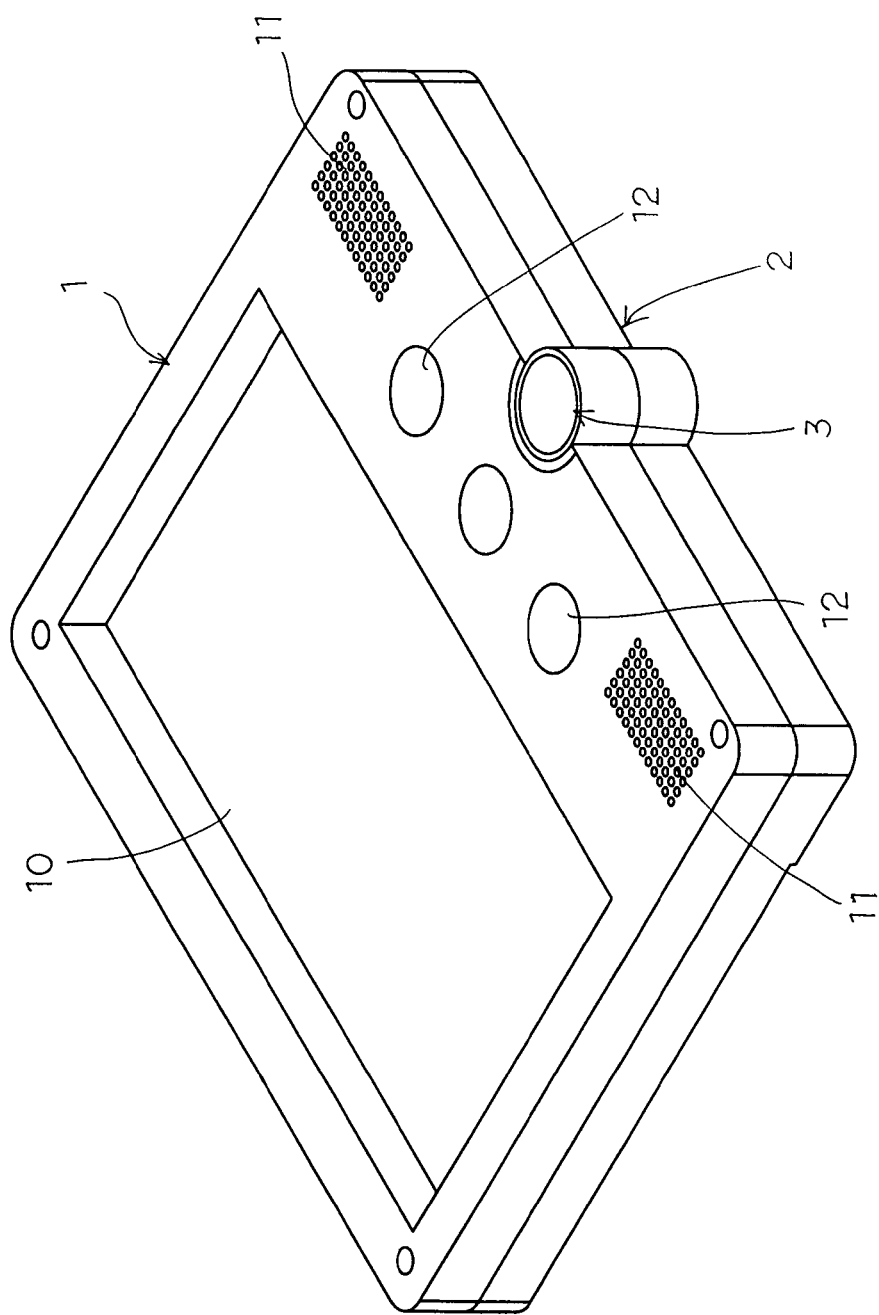
FIG. 5 shows an application status of a preferred embodiment of this invention.
Figure 6:
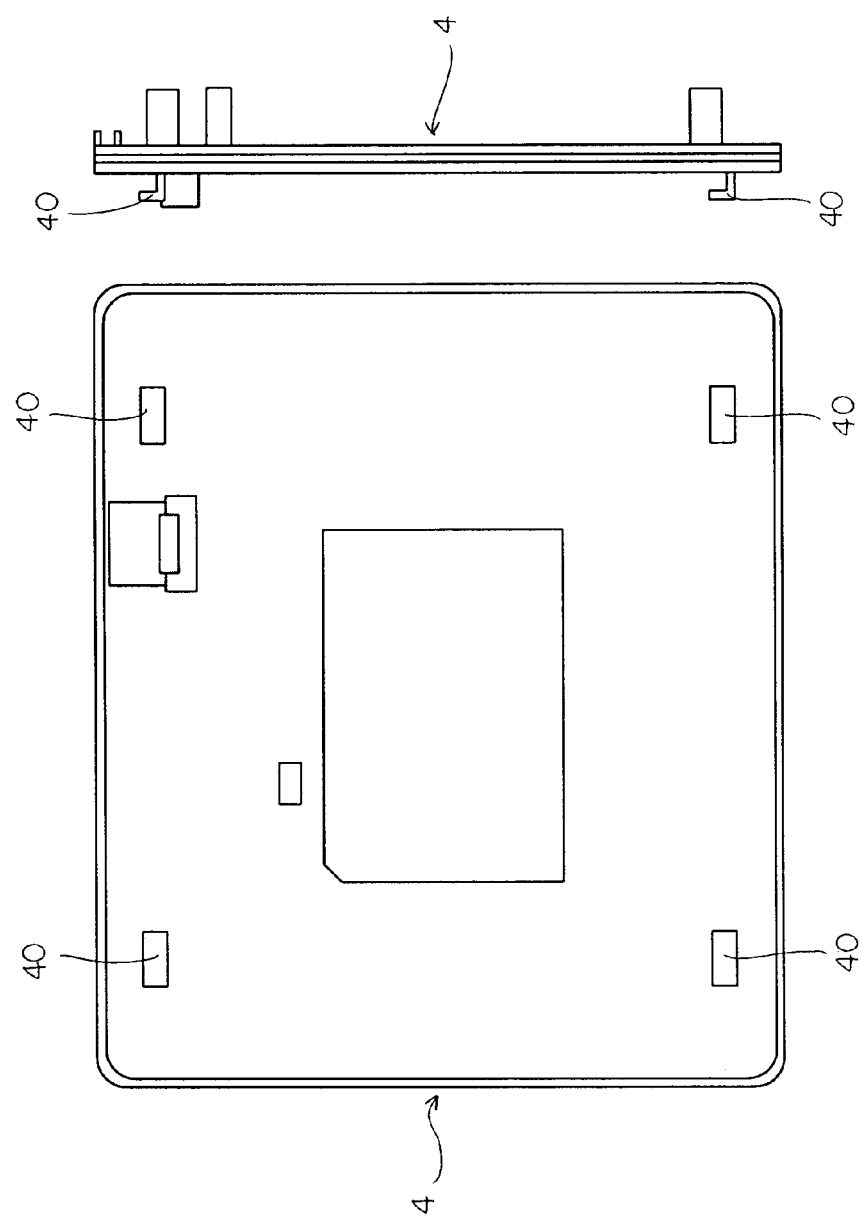
FIG. 6 shows a hanging frame which works with a preferred embodiment of this invention.
Figure 7:
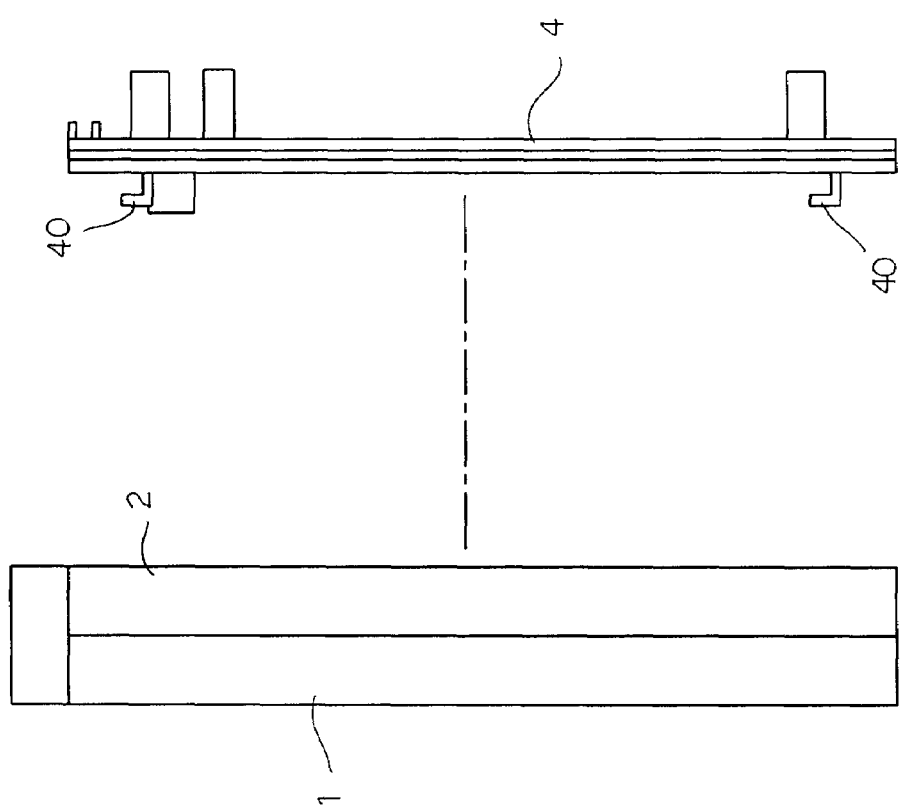
FIG. 7 shows an assembly view of the hanging frame together with a preferred embodiment of this invention

As shown in FIG. 4, there are several hanging holes 212 punched on a corner of the lower casing 21 that can go with a hanging frame 4 to offer another form of application. As shown in FIG. 6, the hanging frame 4 is a panel in a size similar to that of the CD player 2, and there several hooks 40 are corresponding to the position of the hanging holes 212. There are also several posts for fastening the CD player on the hanging frame 40 with bolt or double-faced adhesive foam tape. Both the LCD display 1 and the CD player 2 are turned on, and at 180° the LCD display 1 is reversed to overlap on the back of the CD player 2, and they are hung on the hanging frame 40 as shown in FIG. 5 by inserting the hooks 40 on the hanging frame 4 into the hanging holes 212 on the casing 21 as shown in FIG. 7. By adjusting the control button 12 on the LCD display, it works as the movie screen for a great number of audiences.

Figure 8:
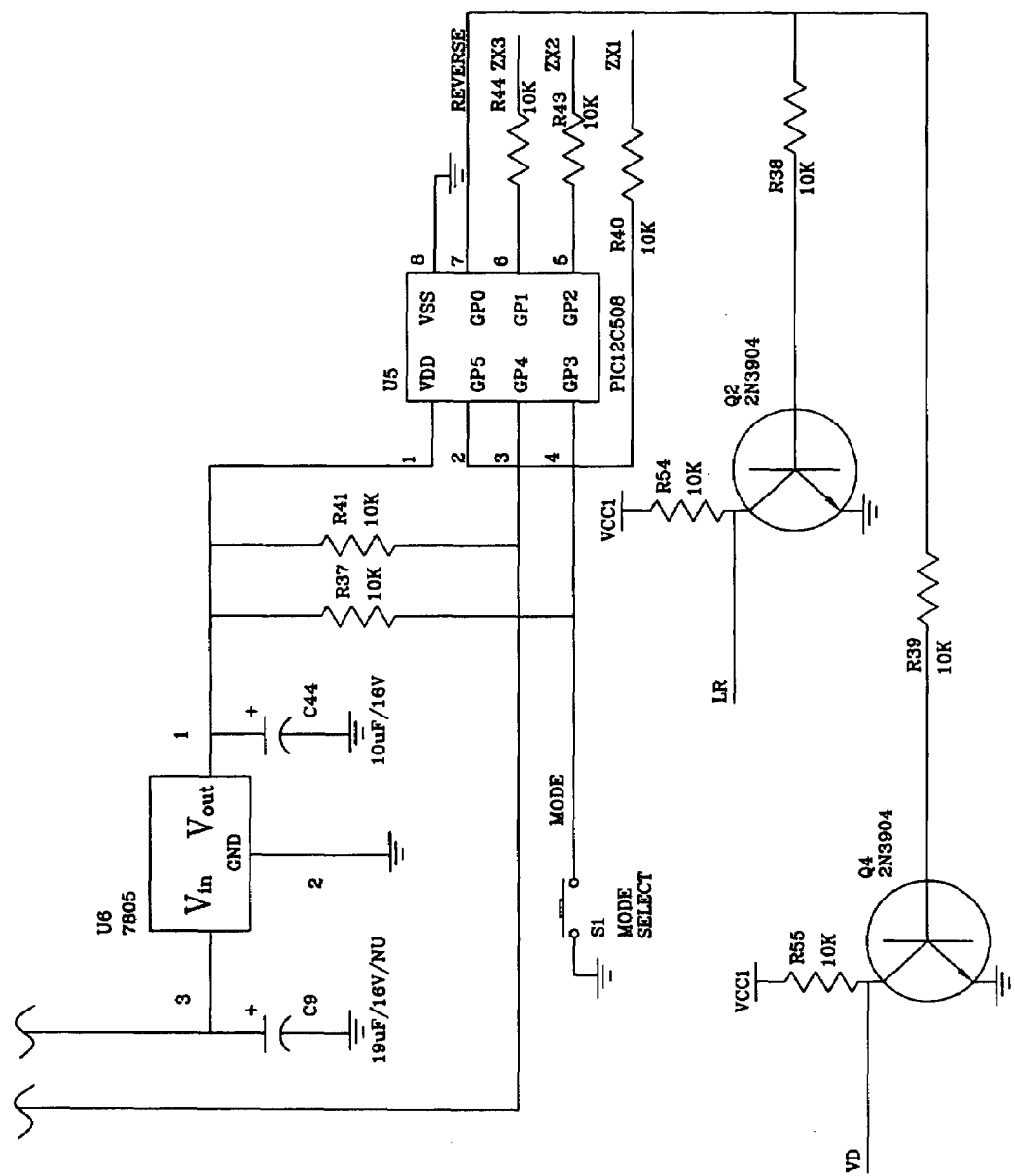
FIG. 8 shows a partial circuit diagram used in this invention.

The 180° reversal of the LCD display 1 is accomplished by the adjusting button 12 and the IC circuit, and the transistor circuit as shown in FIG. 8. The control button 12 can shift the signal left to right or up and down and cause the main IC on the screen 10 to change the signal scanning sequence and reserve the image to achieve this 180° reversal.

This invention is also applicable to the palm type LCD display to achieve the tiny, compact, portable display. The dexterous design and the special post structure of this invention provide rotation and reversal of the LCD display and the CD player enhances the multi-purpose applications, convenient and practicable.

The rotation and reversal mechanism combined with the LCD display and the CD player as provided in this invention is a novel structure, practicable and never occurs in the market, justified for grant of new patent.

Many changes and modifications in the above disclosed embodiment of the invention can, of course, be carried out without departing from the scope thereof. Accordingly, to promote the progress in science and the useful arts, the invention is disclosed and is intended to be limited only by the scope of the appended claims.

What is claimed is:

1. A rotating and reversing mechanism for an LCD display mainly comprising an LCD display and a CD player, in which the LCD display has a display screen, an audio outlet, and control buttons, the CD player consists of an upper casing and a lower casing outfitted with an access slot, a CD reader, and associated circuit, in which the upper casing provides some control buttons too, said mechanism comprising:

the lower end of a joint post being inserted into connecting holes on one rim of the upper and lower casings of the CD player, and locked with a screw permitting the CD player to rotate at a limited angle, and the upper end of the joint post being inserted into a semi-circle cavity of the LCD display and locked with a pin in the LCD display permitting a 360° reversal of the LCD display.

2. The rotating and reversing mechanism for the LCD display as claimed in claim 1, in which the lower casing of the CD player provides several hanging holes on a corner that can be hooked on the hooks on a hanging frame to form a vertical display screen.

3. The rotating and reversing mechanism for the LCD display as claimed in claim 2, in which the hanging frame is a thin panel in the same size as the CD player with end hooks corresponding to the hanging holes on the lower casing for hanging the CD player on the hanging frame and the hanging frame also provides several posts on the rim for fastening the CD player with a bolt or a double faced adhesive foam tape.

* * * * *